(12) United States Patent
Zhang et al.

(10) Patent No.: US 12,058,202 B2
(45) Date of Patent: Aug. 6, 2024

(54) OPC UA BASED MULTI-MECHANICAL DEVICE INTERCONNECTION AND INTERCOMMUNICATION REALIZATION SYSTEM

(71) Applicant: SOUTH CHINA UNIVERSITY OF TECHNOLOGY, Guangzhou (CN)

(72) Inventors: Xianmin Zhang, Guangzhou (CN); Dongdong Xue, Guangzhou (CN); Yanjiang Huang, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/556,095

(22) PCT Filed: Dec. 30, 2022

(86) PCT No.: PCT/CN2022/144385
§ 371 (c)(1),
(2) Date: Oct. 19, 2023

(87) PCT Pub. No.: WO2023/169067
PCT Pub. Date: Sep. 14, 2023

(65) Prior Publication Data
US 2024/0129361 A1 Apr. 18, 2024

(30) Foreign Application Priority Data

Mar. 9, 2022 (CN) .......................... 202210232452.7

(51) Int. Cl.
*H04L 67/10* (2022.01)
*H04L 67/025* (2022.01)

(52) U.S. Cl.
CPC ............ *H04L 67/10* (2013.01); *H04L 67/025* (2013.01)

(58) Field of Classification Search
None
See application file for complete search history.

(56) References Cited

U.S. PATENT DOCUMENTS 9,727,511 B2 * 8/2017 Markovic ............... H04L 63/08
11,153,409 B2 * 10/2021 Andersson ......... G05B 19/4185
(Continued)

FOREIGN PATENT DOCUMENTS

| CN | 111556163 | 8/2020 |
|---|---|---|
| CN | 112764944 | 5/2021 |
| CN | 114785779 | 7/2022 |

OTHER PUBLICATIONS

Min-Feng Li et al., "Development of Equipment Data Acquisition System Based on OPC UA Protocol", Information Technology and Informatization, Jul. 31, 2018, with English abstract, pp. 70-72, No. 7.

(Continued)

*Primary Examiner* — Quang N Nguyen
(74) *Attorney, Agent, or Firm* — JCIPRNET (57) ABSTRACT

The present invention discloses an OPC UA based multi-mechanical device interconnection and intercommunication realization system, which realizes horizontal integration, vertical integration, and arbitrary connectivity between devices and systems by using OPC UA technologies on the basis of multiple different mechanical devices. The software system includes a plurality of different layers, which are a device layer, a device operation layer, a data acquisition layer, a data interaction layer, a network support layer, a data storage layer, an application service layer, and a user interface layer from bottom to top, and each layer has specific functions. The present invention realizes the interconnection and intercommunication of multiple mechanical devices, can realize free communication across the firewall, and has (Continued)

strong reliability, user friendliness, real-time performance, scalability and security.

18 Claims, 11 Drawing Sheets

(56) References Cited

U.S. PATENT DOCUMENTS

| | | | |
|---|---|---|---|
| 11,874,648 B2* | 1/2024 | Albers | G05B 19/4185 |
| 2015/0154136 A1* | 6/2015 | Markovic | G06F 21/44 |
| | | | 710/317 |
| 2017/0060574 A1 | 3/2017 | Malladi et al. | |
| 2020/0280615 A1* | 9/2020 | Andersson | H04L 67/125 |

OTHER PUBLICATIONS

"International Search Report (Form PCT/ISA/210) of PCT/CN2022/144385", mailed on Mar. 20, 2023, with English translation thereof, pp. 1-5.

* cited by examiner

WebService_OPCUA

Support following operations. View service description for a formal definition.

- AnswerDialog
- BrowseNode
- CallMethodNode
- ConnectToClient
- CreateOpcUaClient
- DeleteOpcUaClient
- DisConnectToServer
- GetDialogInformation
- HelloWorld
- ReadFileNode (a)

- ReadNode
- ReadNodeHistory
- ReadNodes
- RemoveSub
- SubEvent
- SubValueChange
- TellValueChangeAndEvent
- WriteFileNode
- WriteNode
- WriteNodes (b)

OPC UA BASED MULTI-MECHANICAL DEVICE INTERCONNECTION AND INTERCOMMUNICATION REALIZATION SYSTEM

CROSS-REFERENCE TO RELATED APPLICATION

This application is a 371 of international application of PCT application serial no. PCT/CN2022/144385, filed on Dec. 30, 2022, which claims the priority benefit of China application no. 202210232452.7, filed on Mar. 9, 2022. The entirety of each of the above mentioned patent applications is hereby incorporated by reference herein and made a part of this specification.

TECHNICAL FIELD

The present invention relates to the field of industrial Internet of Things (IoT), in particular to an OPC UA based multi-mechanical device interconnection and intercommunication realization system.

BACKGROUND

Industrial Internet of Things (IoT) is the application of IoT technology in the manufacturing industry, is the cornerstone of promoting intelligent manufacturing, and it connects various important devices in the manufacturing process to the IoT, to implement the interconnection of things and things, and people and things. Interconnection and intercommunication are the intermediate level of the industrial IoT and the integration of various communication technologies in the manufacturing site, so as to transmit and analyze data generated in various devices and systems, achieve semantic unity, and solve the problem of "information island"; Interconnection and intercommunication is an important prerequisite for intelligent manufacturing.

In a manufacturing workshop, it is often necessary to access devices from different manufacturers with different communication protocols, and the semantics of the devices are different. In addition, a large quantity of standard protocols and private protocols bring poor portability, cross-platform, and scalability of devices and systems, forming an "information island". In order to realize interconnection and intercommunication, it is necessary to convert different protocols to present a standard and semantically unified communication protocol, so as to realize free communication and information interaction by hiding differences, and then solve the multi-source heterogeneous problem of information, open up the data link, and realize the integration and fusion of information. OPC UA is a standardized, well versatile, and compatible communication protocol for implementing the interconnection and intercommunication of the Industrial Internet of Things (IoT), which cannot only solve the problem of information modeling, but also serve as a unified communication protocol to complete the interaction of data, providing a solution for the transmission and analysis of multi-source heterogeneous data. However, at present, most OPC UA development kits can only realize the interconnection and intercommunication of multiple devices within the local area network (LAN), and have not yet solved the communication problem across the LAN, and cannot achieve cross-LAN communication.

SUMMARY

Technical Problem

Technical Solution for the Technical Problem

Technical Solution

In order to solve the problems existing in the prior art, the present invention adopts Web Service to solve the problem of non-communication across the LAN, and free communication across the firewall may be implemented by using the technology based on HTTP protocol. In addition, the service may be developed at different development platforms using different development languages, which has relatively low development difficulty, strong reliability, user friendliness, real-time performance, scalability, security, and the like, and is the exploration and practice of applying OPC UA technology to realize multi-mechanical device interconnection and intercommunication.

To realize an objective of the present invention, the present invention provides an OPC UA based multi-mechanical device interconnection and intercommunication realization system. The interconnection and intercommunication realization system includes a software system having a plurality of different layers, which are a device layer, a device operation layer, a data service layer, a data interaction layer, a network support layer, a data storage layer, an application service layer, and a user interface layer from bottom to top, and each layer has specific functions.

The multi-mechanical device interconnection and intercommunication realization system needs to realize multi-mechanical device interconnection and intercommunication. In particular, it is necessary to realize the integration of the horizontal direction and vertical direction of each device and system, and can realize any communication across the network. Vertical interconnection and intercommunication are implemented by using the OPC UA client, and the client accesses the OPC UA server storing device data, the obtained information is summarized, and bound to the same server to form an aggregation server. However, an upper application may obtain all device information by simply accessing the aggregation server, realizing vertical interconnection and intercommunication. Corresponding to the manufacturing workshop, the interaction between a device and a system at the same layer, control and monitoring of an upper computer system to a lower computer device or system at an adjacent layer, and the interconnection between a device and a system at different LANs are simulated respectively. An overall architecture of an interconnection and intercommunication platform needs to be fully interconnected and intercommunicated.

A plurality of mechanical devices are selected as a device layer at a software layer, and types, development languages, physical locations, and LAN locations of the mechanical devices may be different.

Each mechanical device needs to be provided with separate upper computer control software, corresponding to the device operation layer in the platform software layer, which is a key part for collection and management of original data of the mechanical device, and motion control to the mechanical device.

Embedding an OPC UA server in the upper computer control software of each mechanical device is the basic link to realize the interconnection and intercommunication of multiple mechanical devices, which corresponds to the data service layer in the interconnection and intercommunication platform software layer, is the integration of existing data and control methods, and is the key to achieve semantic unity. In the OPC UA server, after the OPC UA information model of each mechanical device is instantiated, it is necessary to respectively bind data and control methods of the mechanical device to variable nodes and method nodes in the OPC UA address space, and to associate the occurrence of physical events with the triggering of OPC UA events. In addition, the functions included in other OPC UA technologies, such as custom data types, access control, history, and trigger functions for alerts, may be implemented.

Setting a horizontal interconnection and intercommunication module, that is, re-embedding the OPC UA client in the upper computer control software of each mechanical device to form a bidirectional server to implement bidirectional communication between the mechanical devices, corresponding to the data interaction layer in the platform software layer, which is an important application to realize a simple and rapid interaction and collaboration between devices and systems. It is also one of the important meanings of realizing interconnection and intercommunication. A horizontal interconnection and intercommunication module includes two parts: horizontal interconnection and intercommunication within the LAN and horizontal interconnection and intercommunication across the LAN. The interconnection and intercommunication within the LAN is performed by a bidirectional server accessing data in other device servers on the same LAN using ip address. The interconnection and intercommunication across the LAN requires access to servers in different LANs, and only the ip address of the LAN router is exposed in the public network, and the specified OPC UA bidirectional server cannot be accessed directly through the ip address. Therefore, the router first sends an access request to a public network server, and the public network server forwards the request to a router on the corresponding LAN, and then combined with an Intranet penetration technology, the request is sent to the bidirectional server on the corresponding device, so as to realize the interconnection and intercommunication in the cross-LAN.

Further, to ensure arbitrary connectivity across the network, a series of Web Service interfaces are set, and the Web Service interfaces can refer to the OPC UA standard service development. That is, the Web Service server is the network support layer in the software layer. On the basis of the provided Web Service interface, a Web page application may be developed based on a Browser/Server (B/S) architecture, or a remote client application may be developed based on a Client/Server (C/S) architecture.

When the Web page application is developed based on the B/S architecture, in a case that the Web page application is used as a top layer application of an interconnection and intercommunication platform top layer, its database, back end, and front end are respectively corresponding to the data storage layer, the application service layer, and the user interface layer in the platform software layer. Web page application is a comprehensive application for remote running status monitoring, running process control, and running data storage and management of multiple mechanical devices. The data storage layer is responsible for storing data. The application service layer is responsible for managing user information, managing historical data storage policies, and monitoring devices. The user interface layer is used for providing a graphical interface to interact with users, and the interface may be easily accessible through a browser.

The C/S framework is similar to the B/S framework, but the difference is that the Browse is used instead of the Client, that is, the Client interacts with the users. Therefore, the data storage layer, the application service layer, and the user interface layer correspond to the B/S framework, but the user interface layer is an independent interface. In this way, the Client accesses the Server through independent Client software rather than relying on the browser.

BENEFICIAL EFFECTS OF THE PRESENT INVENTION

Beneficial Effects

Compared with the prior art, the present invention can achieve at least the following beneficial effects:

(1) The present invention combines Web Service technology to realize cross-LAN information interaction, integration and remote control.

(2) The present invention can access device data across LAN in real time on any device on any platform.

(3) The Web Service service interface of the present invention is consistent with the OPC UA standard service interface, greatly reducing the secondary development cost.

(4) The present invention can realize the collaboration of multi-device in workshops, and is conducive to accelerating resource scheduling and reducing production cost.

EMBODIMENTS OF THE INVENTION

Detailed Description of Embodiments

In order to make objectives, technical schemes, and advantages of an embodiment of the present invention clearer, the technical scheme in the embodiment of the present invention will be clearly and completely described in combination with the drawings attached to the embodiment of the present invention. Obviously, the embodiment described is a part of rather than all of the embodiments of the present invention. All other implementations obtained by a technician skilled in the field without making a creative technique are the scope of protection of the present invention.

Referring to FIG. 1 to FIG. 11, the present invention provides an OPC UA based multi-mechanical device interconnection and intercommunication realization system, including a software system having different layers. The software system includes a device layer, a device operation layer, a data service layer, a data interaction layer, a network support layer, a data storage layer, an application service layer, and a user interface layer from bottom to top.

The device layer includes a plurality of mechanical devices, and the plurality of mechanical devices are located in the same or different LANs. In some embodiments of the present invention, four mechanical devices are selected as a platform base, including a planar 3PRR parallel positioning platform and SCARA Robot 1 developed in C# on the same LAN, and a SCARA Robot 2 and a SCARA Robot 3 on another LAN with a C++ secondary development interfaces. Different manufacturing devices located in different manufacturing workshops may be simulated by using the plurality of existing mechanical devices in different LANs with different development languages.

Figure 1:
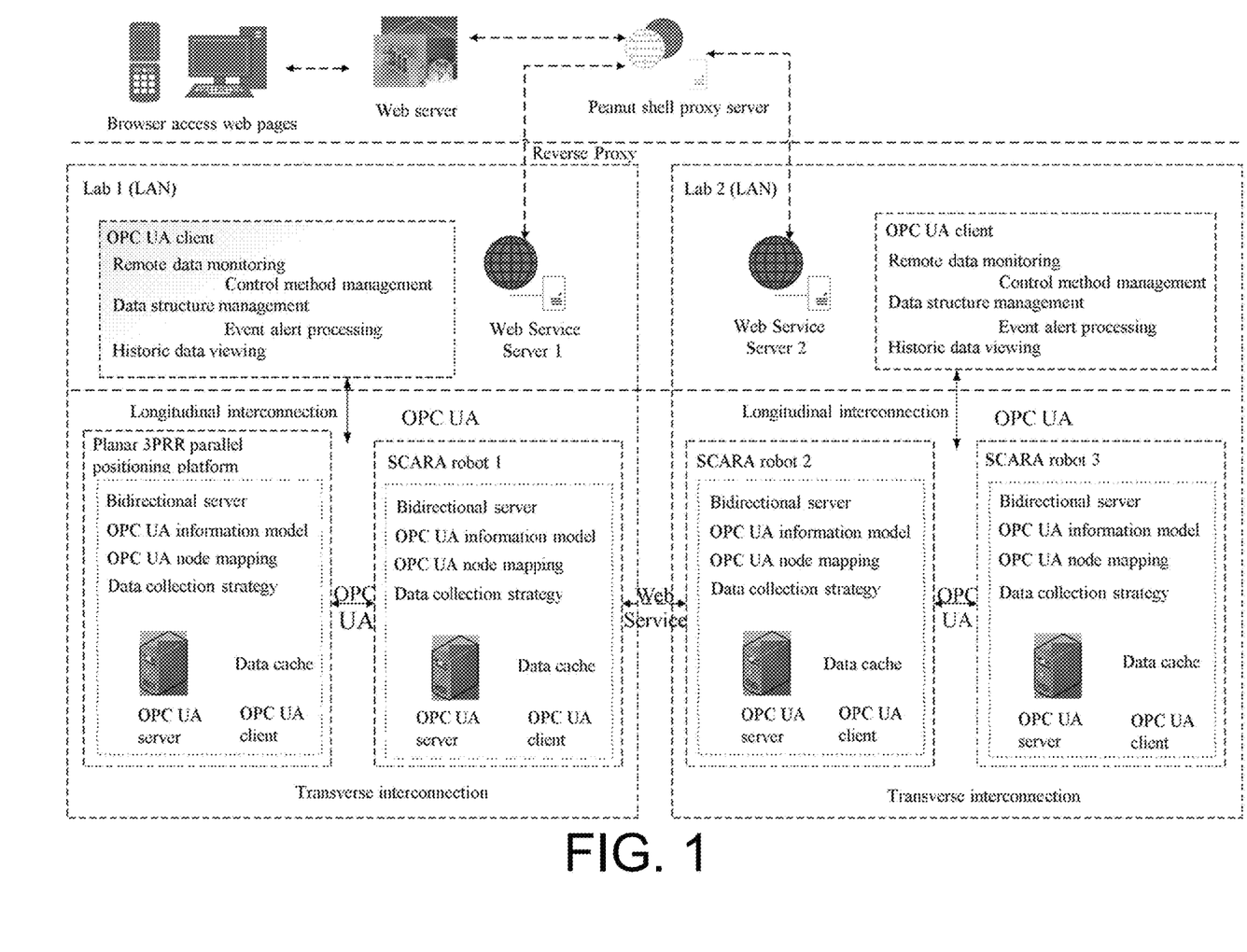
FIG. 1 is a schematic diagram of a software layer of an OPC UA based interconnection and intercommunication platform established according to an embodiment of the present invention.
Figure 2:
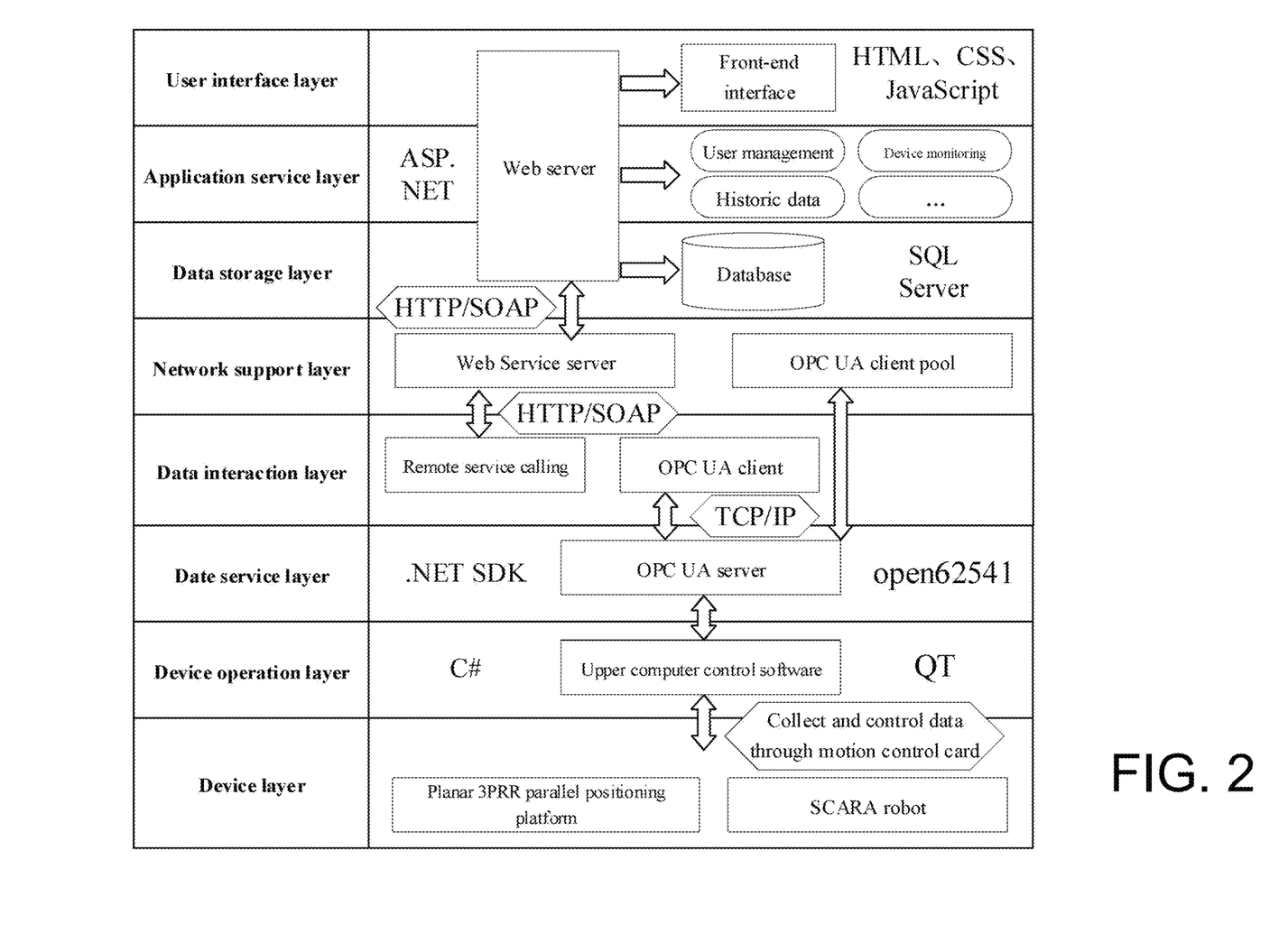
FIG. 2 is a schematic diagram of an overall architecture of an OPC UA based interconnection and intercommunication platform established according to an embodiment of the present invention.

An overall architecture of an OPC UA based interconnection and intercommunication realization system established by the existing basic mechanical devices is as shown in FIG. 1, and its software layer is as shown in FIG. 2. An OPC UA server and an OPC UA client are established between the planar 3PRR parallel positioning platform and the SCARA robots through information model, node mapping, data collection strategy, and data cache binding underlying data source, to form a bidirectional server and a control interface. An OPC UA client is established in each LAN to perform OPC UA communication with mechanical devices in the LAN, and the client is ought to have remote data monitoring, control method management, data structure management, event alarm processing, and historical data viewing functions. In some embodiments of the present invention, third-party software UaExpert is adopted as an upper computer OPC UA client in the LAN, and the UaExpert has relatively more complete OPC UA client functions, which can realize the foregoing predetermined functions. Then, Web Service servers are established in two LANs respectively; and after the developed Web Service application is released through the IIS, the Intranet penetration software is used to implement Intranet penetration through a reverse proxy, so that external networks can invoke the Web Service interface through a fixed URL. Finally, the Web page application is developed based on the B/S architecture. A user accesses a Web page through a browser in a mobile phone or computer, and a back-end program of the Web server accesses the OPC UA server by calling a Web Service interface to implement interaction, so as to realize the remote monitoring and control of the mechanical device.

In some embodiments of the present invention, the internal network penetration software uses peanut shell software.

Figure 3:
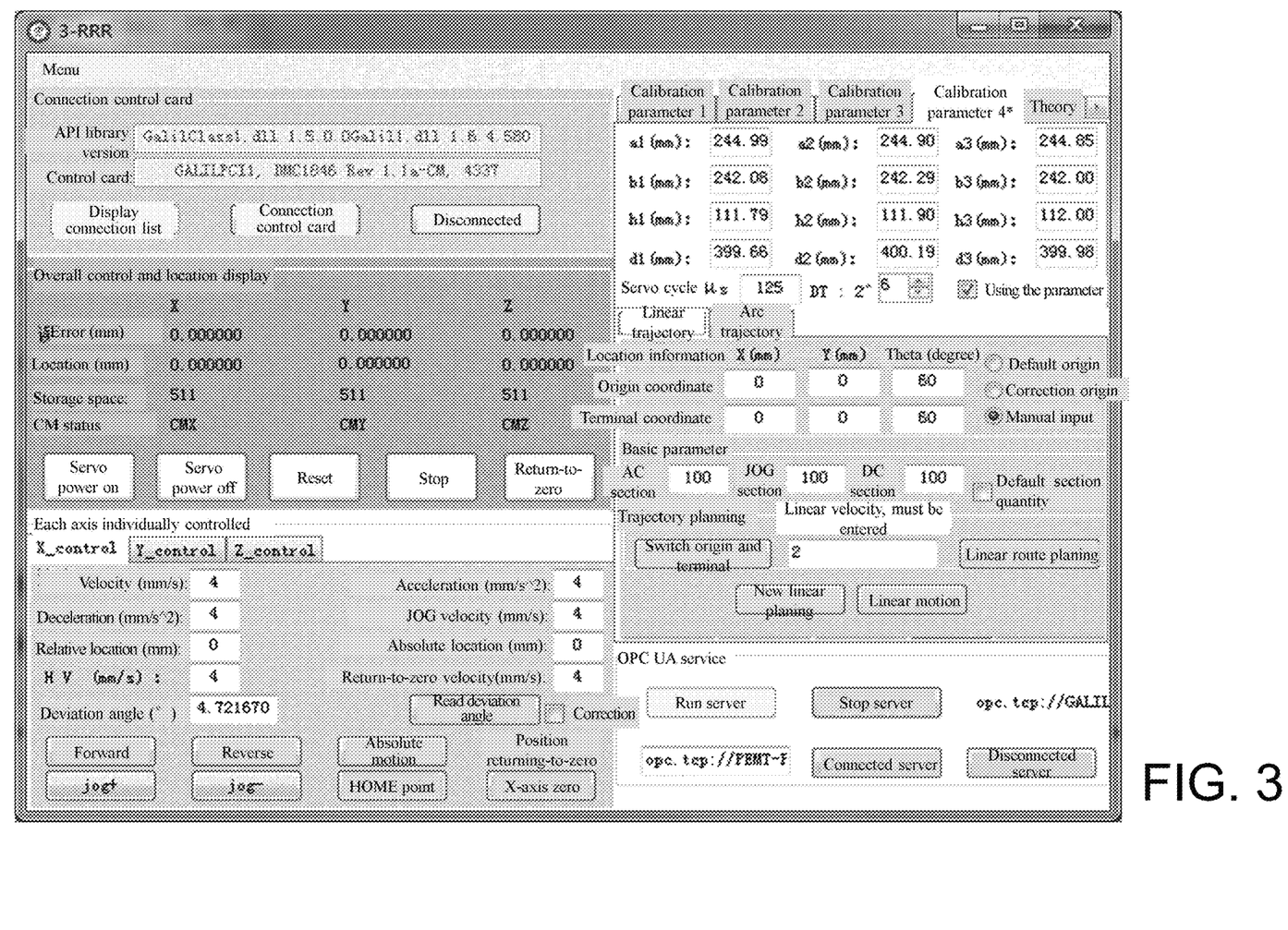
FIG. 3 to FIG. 5 are schematic diagrams of upper computer control software of mechanical devices according to embodiments of the present invention.
Figure 4:
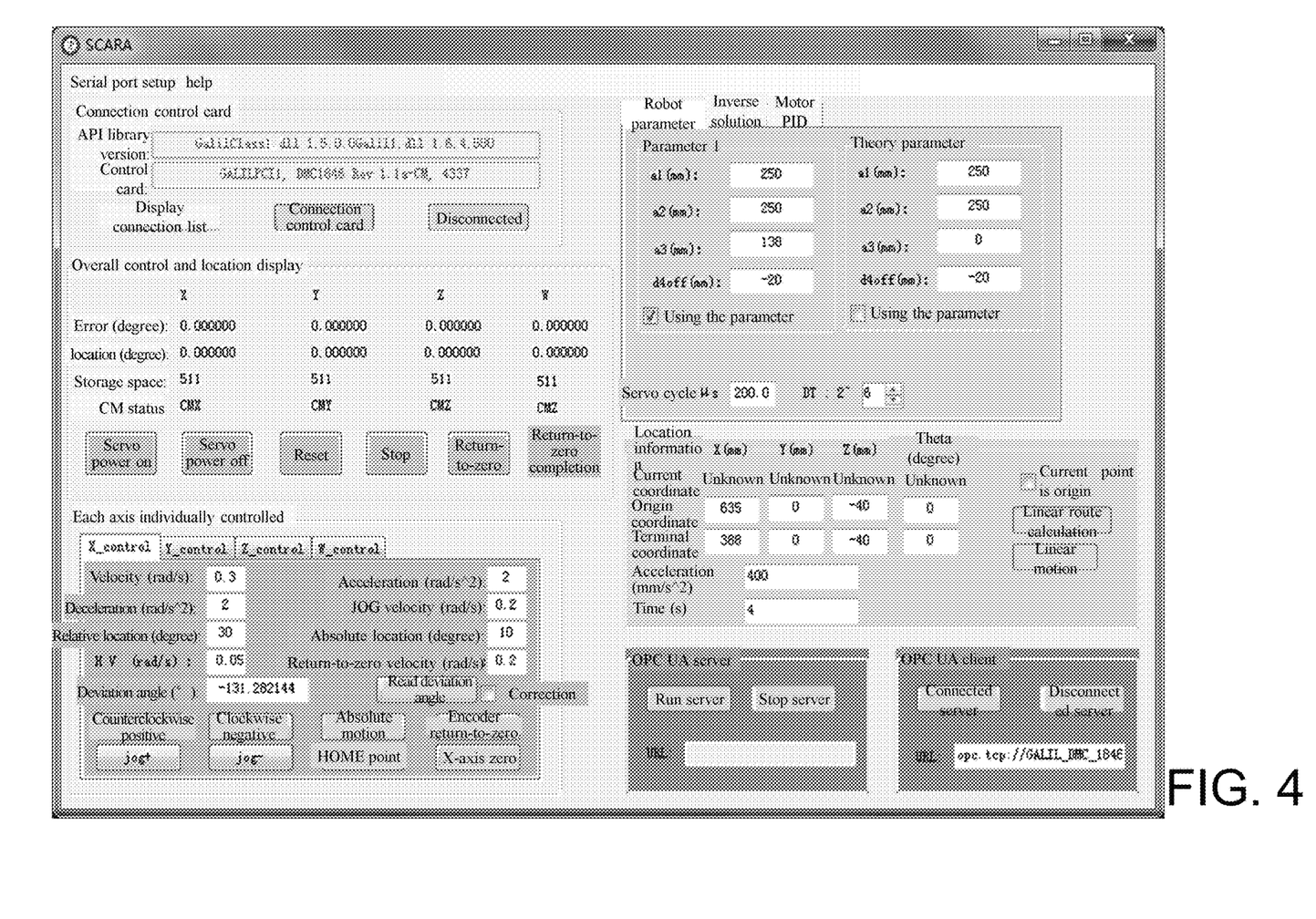
Figure 5:
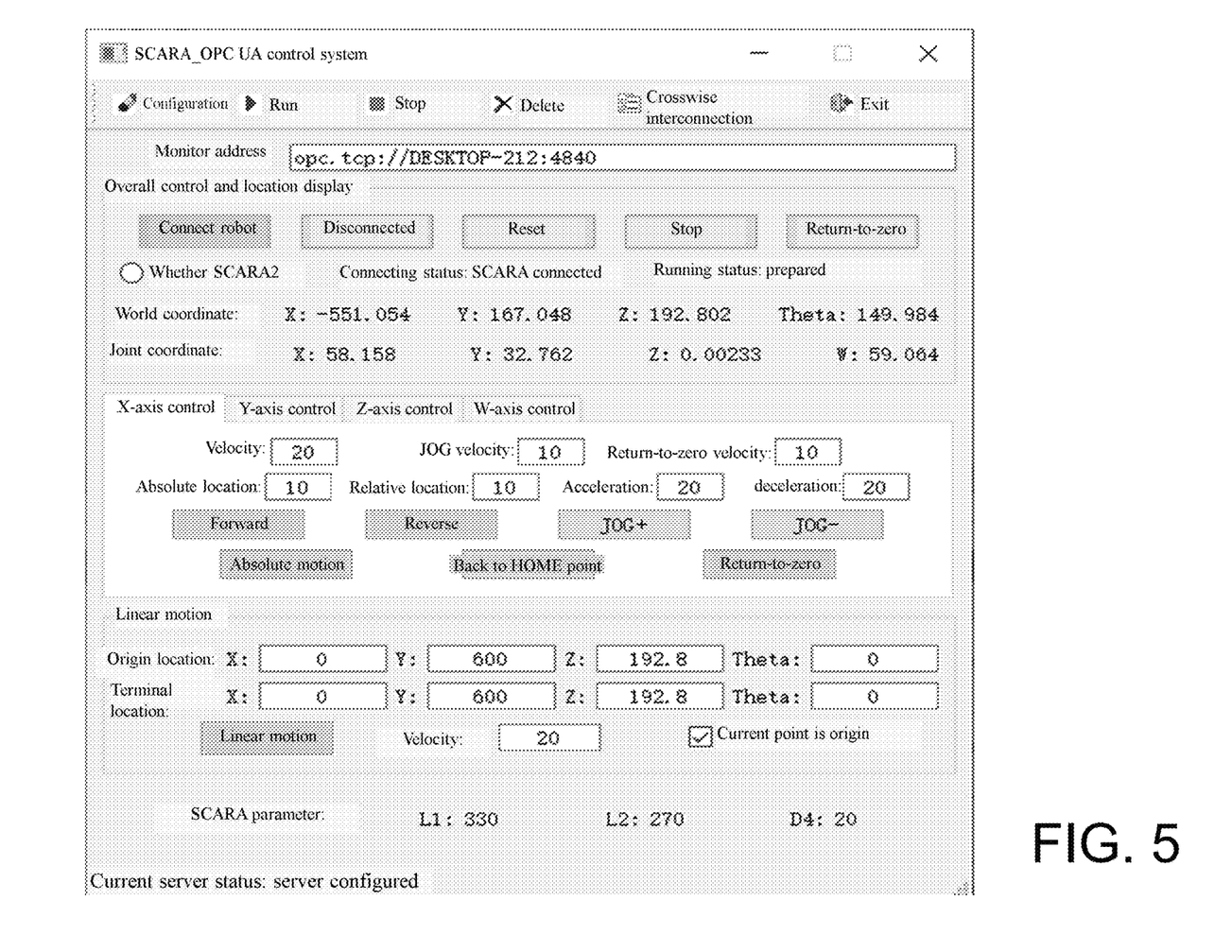

In the upper computer control software of each mechanical device, a grating ruler, a photoelectric sensor, and a motion control card are used to obtain information of the mechanical devices and perform motion control to the mechanical devices. Upper computer control software interfaces of four mechanical devices are as shown in FIG. 3 to FIG. 5, motion control may be implemented on a 3-PRR robot and two different types of SCARA robots respectively. Specifically, servo power on, servo power off, reset, stop, real-time monitoring of each axis coordinate, and real-time monitoring of the end position can be implemented. For the motion part, position returning to zero, single axis positive and inverse rotation, point motion, linear motion planning, and arc motion planning can be implemented. For the data transmission part, running and stop of OPC UA servers and connection and disconnection of other device servers can be realized.

Figure 6:
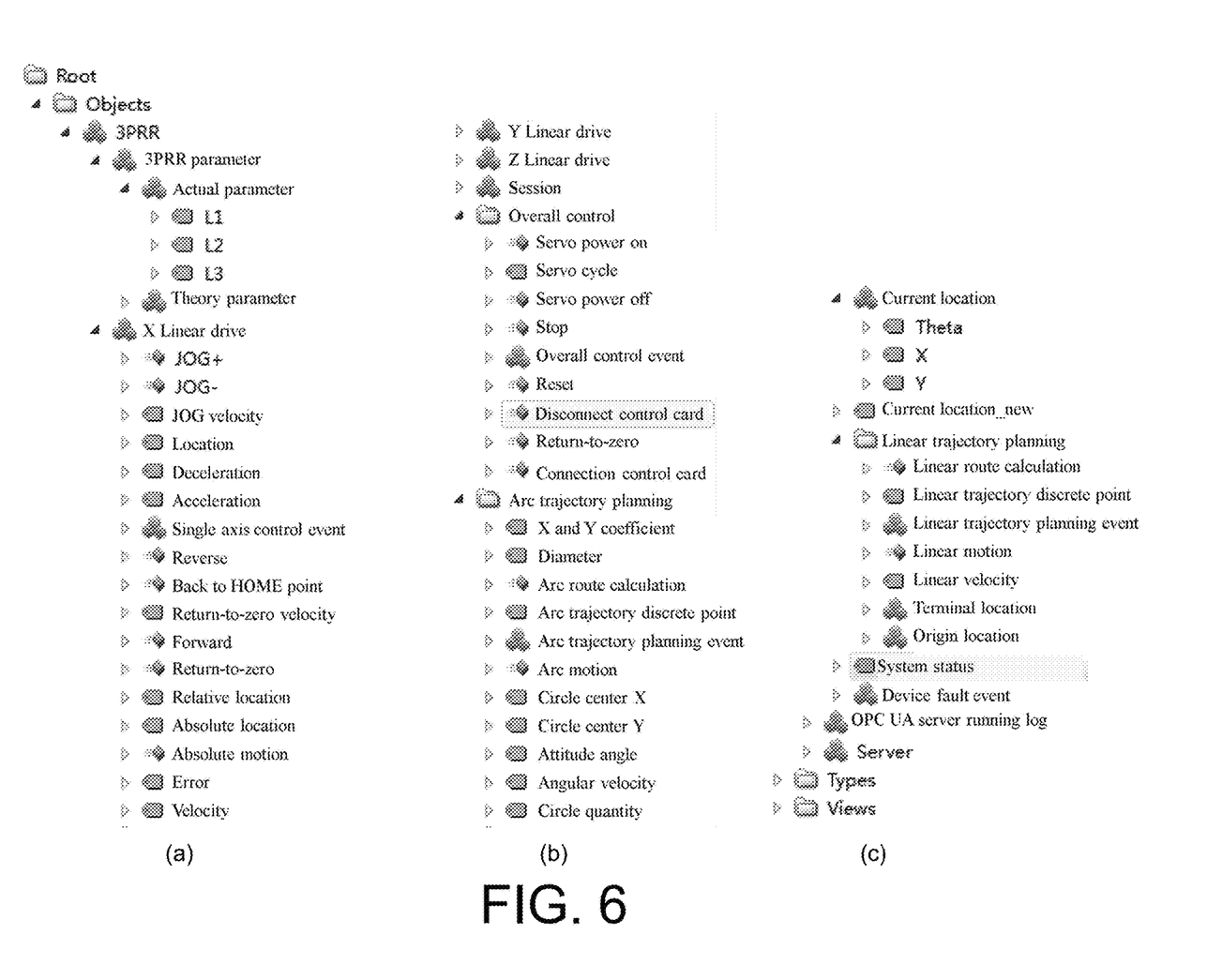
FIG. 6 and FIG. 7 are schematic diagrams of nodes in an address space of an OPC UA server according to embodiments of the present invention.
Figure 7:
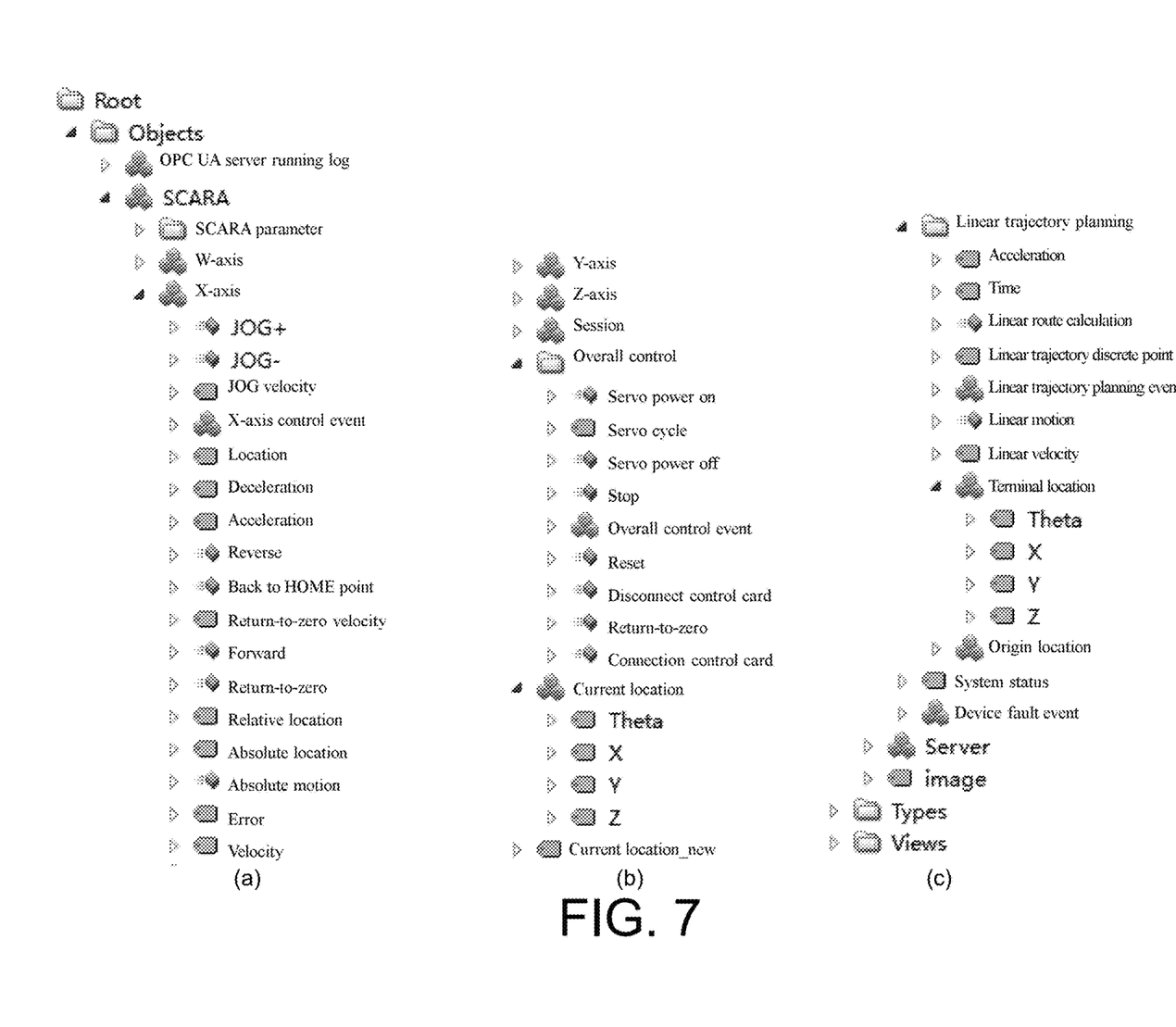

OPC UA SDK is used for secondary development, and the OPC UA server is embedded into each upper computer control software. XML files can be used to realize the instantiation of the information model, various message triggering mechanisms can be used to realize the binding of data sources and data, binding of physical events and OPC UA events, and function pointers can be used to realize the binding of control methods and method nodes. The OPC UA server function may be verified in the UaExpert address space window, data access view, historical trend view, and event view. FIG. 6 and FIG. 7 show nodes when browsing the address space. FIG. 6 and FIG. 7 show node information models of a 3PRR robot and a SCARA robot by using a tree structure respectively. In FIG. 6, a 3PRR root node includes a plurality of parameters of the robot, such as positions of axes; and a plurality of control methods, such as positive and negative rotation of each axis.

Figure 8:
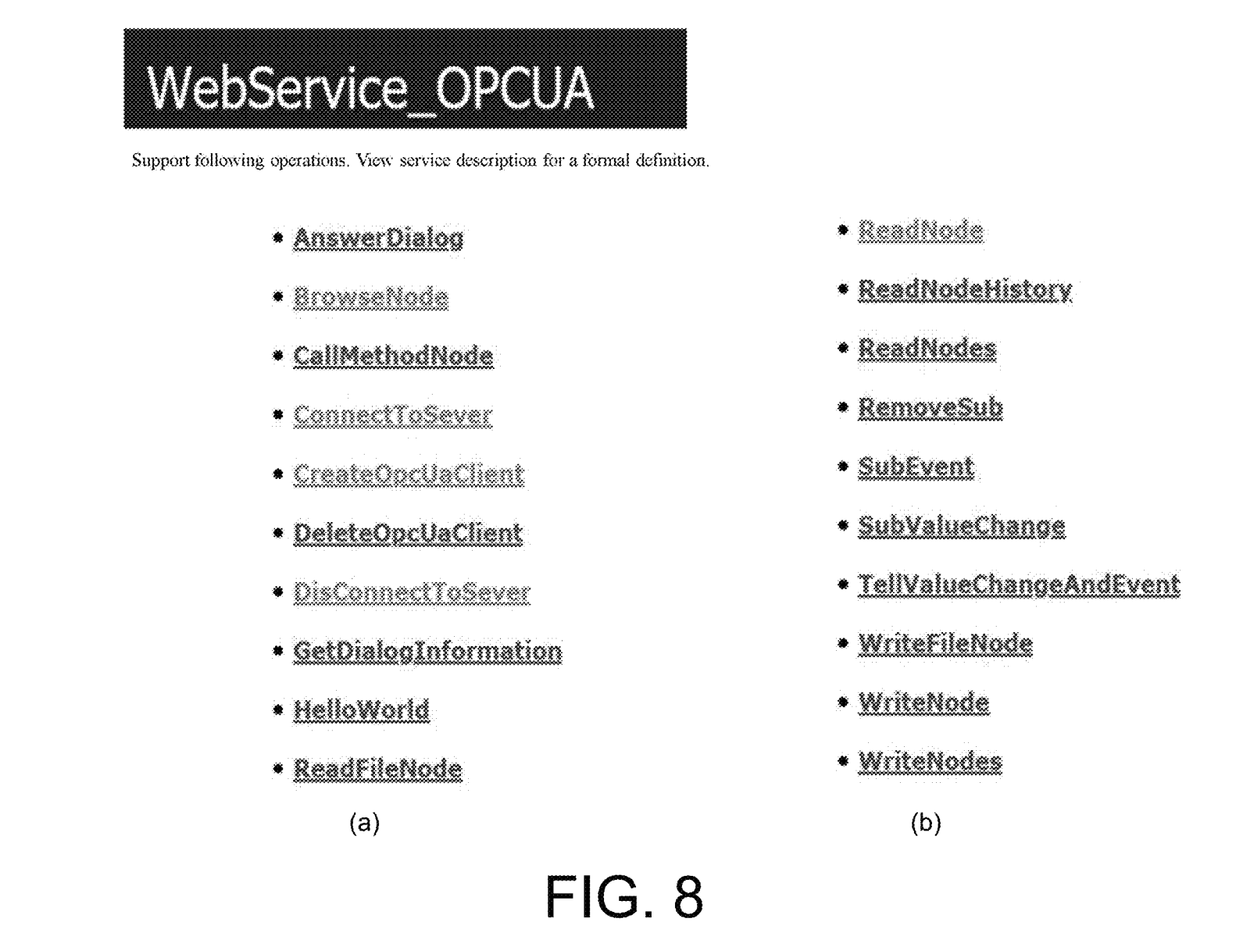
FIG. 8 is a schematic diagram of a Web Service interface according to an embodiment of the present invention.

Combined with the standard services of OPC UA, the Web Service interface developed by ASP.NET is used, which includes creating OPC UA clients, connecting OPC UA servers, calling methods, reading and writing variable nodes, creating subscriptions, and responding to event Web Service interfaces. As shown in FIG. 8, the functions are arranged in lexicographic order. They are responding to an event, browsing node, calling method nodes, connecting servers, creating OPC UA clients, deleting OPC UA clients, disconnecting server, obtaining diagnostic information, HelloWorld query, reading file nodes, reading single node, reading node history, reading node batch, removing subscription, subscribing events, changing subscription parameter, changing event and value, writing file nodes, writing single node, and writing batch node. A Web Service server is provided in each LAN and Intranet mapping is implemented.

Figure 9:
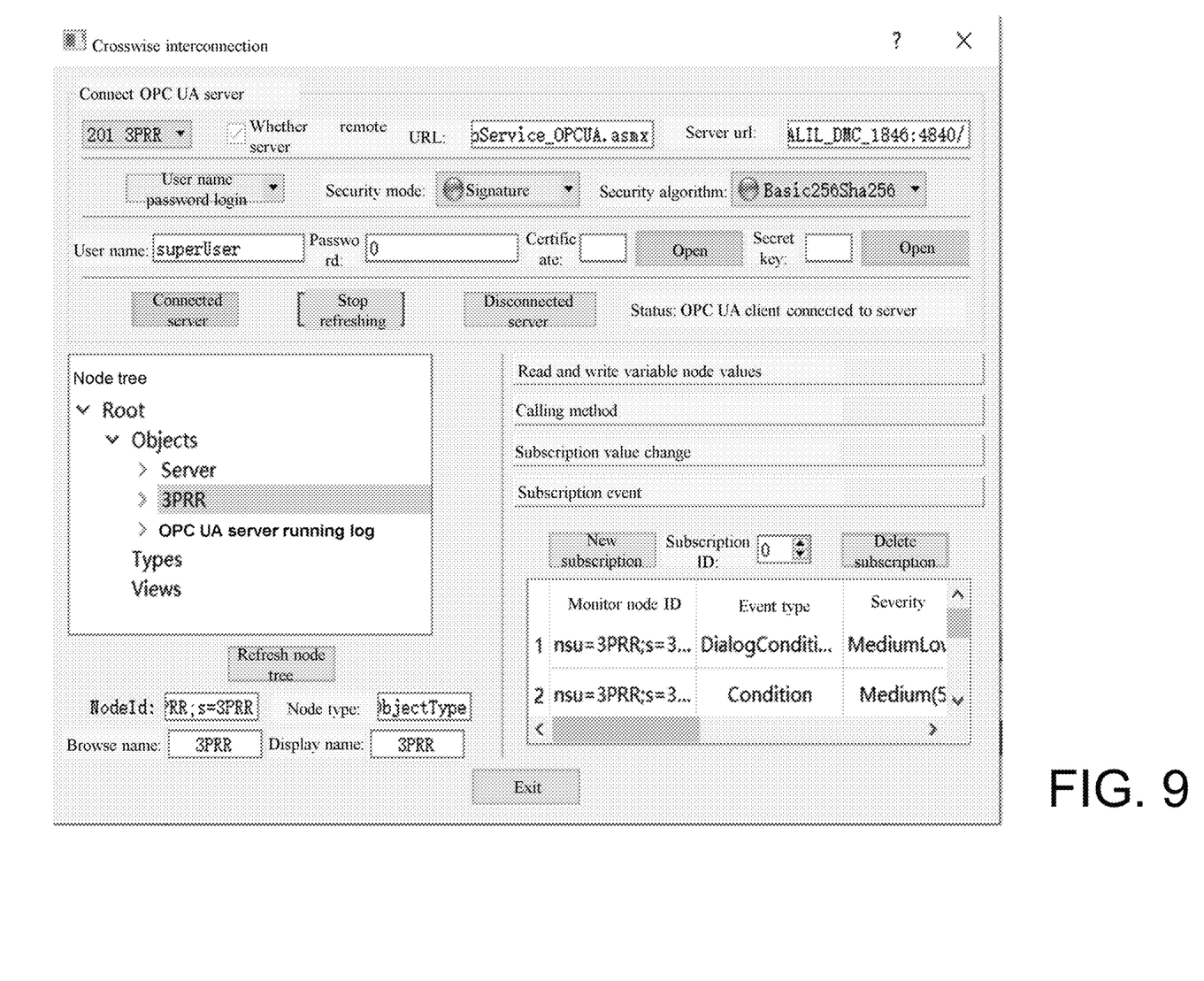
FIG. 9 is a schematic diagram of an interconnection and intercommunication module in a horizontal direction according to an embodiment of the present invention.

The interconnection and intercommunication module in a horizontal direction is as shown in FIG. 9, and the first line is to select a server connecting to different devices. A second line and a third line show login methods. The lower left side shows a quantity of information nodes in a connected server, attributes of the selected node are shown under the quantity of nodes, and the lower right side shows content of controlling and subscribing nodes in the server. Among them, the interconnection and intercommunication within the LAN is directly connected using the C/S architecture, and the interconnection and intercommunication across the LAN is obtained by accessing a fixed URL and calling a Web Service, to obtain JSON data and parse it to realize real-time monitoring of a remote mechanical device.

Figure 10:
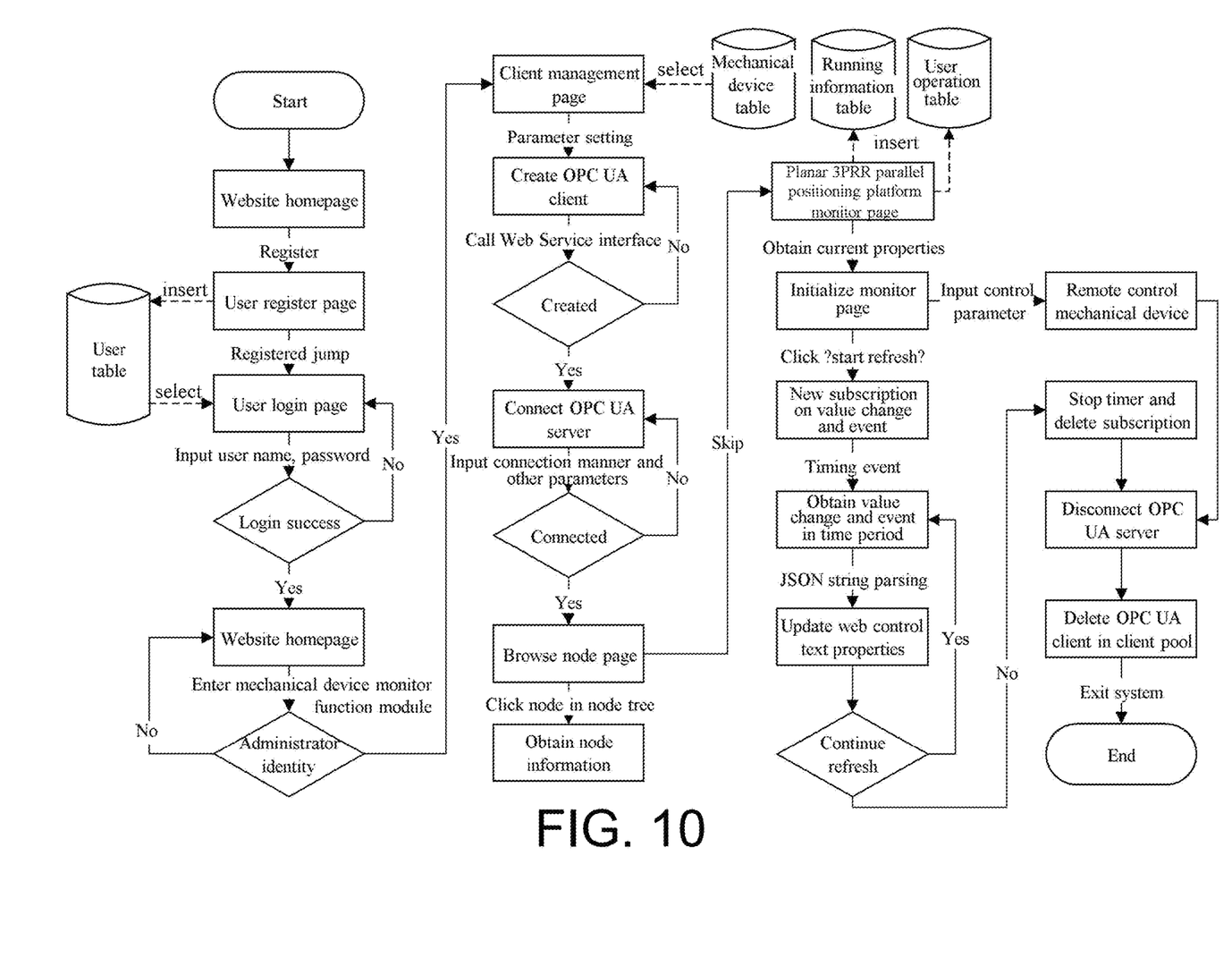
FIG. 10 is a schematic flowchart of a logistic for remote monitoring and controlling a mechanical device in a Web page application according to an embodiment of the present invention.

In some embodiments of the present invention, the Web page application is developed using ASP.NET, the front end is developed using CSS, JavaScript, HTML, the back end is developed using C# language, and the database is developed using a SQL Server. To implement registration, login, client management, system management functions on the Web page, the most important is the remote monitoring and control of mechanical device. The logistic procedure is as shown in FIG. 10. A user first needs to register an account on a website; registration information will be inserted into a user table; after logging in to the website to obtain an administrator identity, the user can enter a mechanical device monitoring function module; when a corresponding device is selected, a Web Service interface will be invoked to create an OPC UA client, and a connection manner and parameters are selected to connect to the OPC UA server. After the server is successfully connected, the user can monitor and control a device bound with the client by browsing a quantity of information nodes of the device; enter a control interface of the corresponding device, subscribe a value variable node of the device; and monitor a device event. Across-LAN devices perform data transmission through JSON format. When it is necessary to disconnect, the user disconnects the OPC UA server first, and then deletes the OPC UA client from the OPC UA client pool and exits the system.

Figure 11:
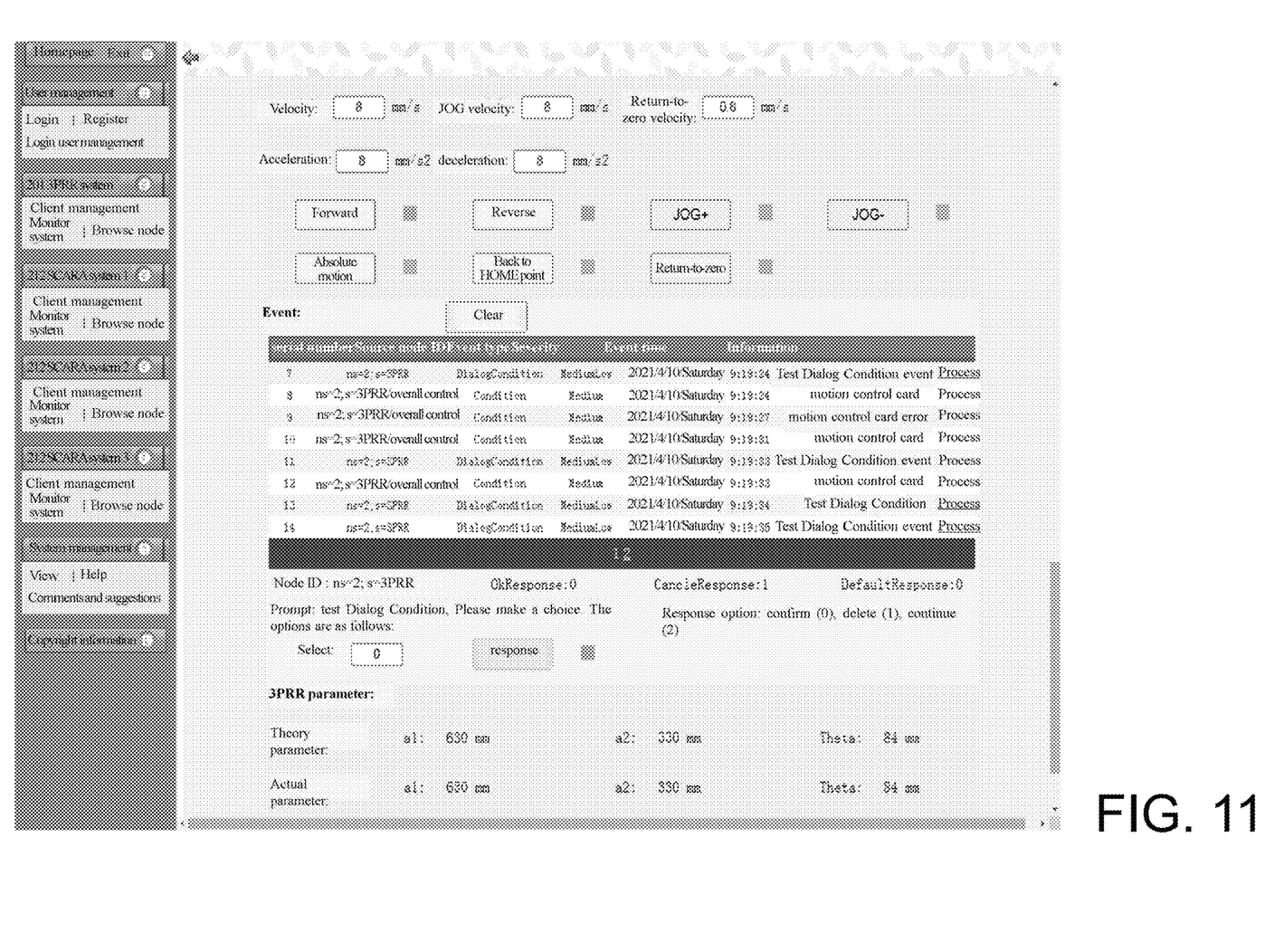
FIG. 11 is a schematic diagram of a real-time interface of a Web page application according to an embodiment of the present invention.

In some embodiments the present invention, the Web page performs remote monitoring and control as shown in FIG. 11. Different mechanical devices in a plurality of LANs are shown at the left side, and running status information of the selected device and selectable control methods are shown at the right side. In the process of Web page application development, encryption mechanism is used to ensure security, error handling mechanism to ensure reliability, and AJAX technology to ensure user-friendliness and real-time performance of the Web page application.

An embodiment of the present invention selects a variety of typical mechanical devices in the industrial field as the base platform, and provides an OPC UA based mechanical device interconnection and intercommunication realization system. The application of OPC UA technology in mechanical devices is explored and practiced, which has certain significance for promoting the development of interconnection and intercommunication and intelligent manufacturing.

The above description of the disclosed embodiments enables professional personnel in the field to realize or use the invention. A variety of modifications to these embodiments will be apparent to those professional personnel in the field, and the general principles defined herein may be realized in other embodiments without departing from the spirit or scope of the present invention. Therefore, the present invention will not be limited to these embodiments shown herein, but will conform to the widest range consistent with the principles and novel features disclosed herein.

What is claimed is:

1. An Open Platform Communications Unified Architecture (OPC UA) based multi-mechanical device interconnection and intercommunication realization system, which comprises multiple software systems of different layers, the software system comprising:

a device layer, a device operation layer, a data service layer, a data interaction layer, a network support layer, a data storage layer, an application service layer, and a user interface layer from bottom to top; wherein the device layer comprises a plurality of mechanical devices, the plurality of mechanical devices are located in the same or different local area networks (LAN), and each LAN is provided with an OPC UA client for OPC UA communication with the mechanical device in the LAN, and Web Service servers are set up in each LAN and Intranet penetration software is used for reverse proxy;

the device operation layer comprises upper computer control software configured to control each mechanical device, and each upper computer control software is used for collecting and managing original data of each mechanical device and performing motion control on the mechanical device;

the data service layer comprises an OPC UA server embedded in the upper computer control software in each mechanical device, and is configured to integrate existing data and control methods to achieve semantic unity;

the data interaction layer is configured to further embed an OPC UA client in the upper computer control software of each mechanical device to form a bidirectional server, to implement bidirectional communication between mechanical devices to achieve horizontal interconnection and intercommunication and vertical interconnection and intercommunication is implemented by using the OPC UA client, and the OPC UA client accesses the OPC UA server storing device data, the obtained information is summarized, and bound to the same server to form an aggregation server, and an upper-layer application obtains all device information by simply accessing the aggregation server;

the network support layer comprises a Web Service interface, and arbitrary cross-network connection is implemented by using a Web Service server; and a Web page application is set as a top-level application, which is a comprehensive application for remote status monitoring, control, data storage and management of the plurality of mechanical devices, and among them, a database, back-end and front-end of the Web page application correspond to the data storage layer, the application service layer, and the user interface layer in the software system respectively.

2. The OPC UA based multi-mechanical device interconnection and intercommunication realization system according to claim 1, wherein the OPC UA client provided in the LAN has remote data monitoring, control method management, data structure management, event alarm processing, and historical data viewing function.

3. The OPC UA based multi-mechanical device interconnection and intercommunication realization system according to claim 1, wherein types, development languages, and LAN locations of each mechanical device are the same or different.

4. The OPC UA based multi-mechanical device interconnection and intercommunication realization system according to claim 1, wherein the data service layer is specifically configured to: embed an OPC UA server in the upper computer control software to realize instantiation of an information model, binding between a data source and a variable node, binding between a control method and a method node, and binding between a physical event and an OPC UA event.

5. The OPC UA based multi-mechanical device interconnection and intercommunication realization system according to claim 1, wherein third-party software UaExpert is used as an upper computer OPC UA client in the LAN.

6. The OPC UA based multi-mechanical device interconnection and intercommunication realization system according to claim 1, wherein the Web page application is developed based on a B/S architecture.

7. The OPC UA based multi-mechanical device interconnection and intercommunication realization system according to claim 1, wherein OPC UA SDK is used for secondary development, and the OPC UA server is embedded into each upper computer control software.

8. The OPC UA based multi-mechanical device interconnection and intercommunication realization system according to claim 1, wherein the Web Service interface comprises creating the OPC UA client, connecting the OPC UA server, calling method, reading and writing the variable node, creating subscription, and responding to the Web Service interface.

9. The OPC UA based multi-mechanical device interconnection and intercommunication realization system according to claim 1, wherein the horizontal interconnection and intercommunication comprises horizontal interconnection and intercommunication within the LAN and horizontal interconnection and intercommunication across the LAN, wherein the interconnection and intercommunication within the LAN is performed by a bidirectional server accessing data in other device servers on the same LAN using ip address, and the interconnection and intercommunication across the LAN is performed by firstly sending an access request to a public network server by a router, and forwarding the request to a router on the corresponding LAN by the public network server, and then combined with Intranet penetration, sending the request to the bidirectional server on the corresponding device.

10. The OPC UA based multi-mechanical device interconnection and intercommunication realization system according to claim 1, wherein the Web page application is replaced with a remote client application.

11. The OPC UA based multi-mechanical device interconnection and intercommunication realization system according to claim 2, wherein the Web page application is replaced with a remote client application.

12. The OPC UA based multi-mechanical device interconnection and intercommunication realization system according to claim 3, wherein the Web page application is replaced with a remote client application.

13. The OPC UA based multi-mechanical device interconnection and intercommunication realization system according to claim 4, wherein the Web page application is replaced with a remote client application.

14. The OPC UA based multi-mechanical device interconnection and intercommunication realization system according to claim 5, wherein the Web page application is replaced with a remote client application.

15. The OPC UA based multi-mechanical device interconnection and intercommunication realization system according to claim 6, wherein the Web page application is replaced with a remote client application.

16. The OPC UA based multi-mechanical device interconnection and intercommunication realization system according to claim 7, wherein the Web page application is replaced with a remote client application.

17. The OPC UA based multi-mechanical device interconnection and intercommunication realization system according to claim 8, wherein the Web page application is replaced with a remote client application.

18. The OPC UA based multi-mechanical device interconnection and intercommunication realization system according to claim 9, wherein the Web page application is replaced with a remote client application.

* * * * *